United States Patent
Kaneda et al.

(10) Patent No.: US 6,450,432 B1
(45) Date of Patent: Sep. 17, 2002

(54) TAPE CARTRIDGE

(75) Inventors: Hiroshi Kaneda; Masatoshi Okamura; Shinichi Sato, all of Tokyo (JP)

(73) Assignee: TDK Corporation, Tokyo (JP)

( * ) Notice: Subject to any disclaimer, the term of this patent is extended or adjusted under 35 U.S.C. 154(b) by 95 days.

(21) Appl. No.: 09/657,860

(22) Filed: Sep. 8, 2000

(30) Foreign Application Priority Data

| Sep. 8, 1999 | (JP) | 11-254065 |
| Sep. 9, 1999 | (JP) | 11-255421 |
| Jul. 12, 2000 | (JP) | 2000-211225 |
| Jul. 12, 2000 | (JP) | 2000-211263 |

(51) Int. Cl.$^7$ ............................................. G11B 15/66
(52) U.S. Cl. .................................. 242/332.4; 360/132
(58) Field of Search ........................ 242/332.4, 532.1, 242/532.7, 582; 360/132

(56) References Cited

U.S. PATENT DOCUMENTS

| 4,364,529 A | 12/1982 | Barto, Jr. et al. |
| 4,694,557 A | 9/1987 | Gelardi |
| 5,971,310 A | 10/1999 | Saliba et al. |

FOREIGN PATENT DOCUMENTS

| EP | 0 932 155 A2 | 7/1999 |
| JP | 58-169380 | 10/1983 |
| JP | 62-502641 | 10/1987 |
| JP | 10-149661 | 6/1998 |
| JP | 2000-215639 A | 8/2000 |

*Primary Examiner*—John Q. Nguyen
(74) *Attorney, Agent, or Firm*—Akin, Gump, Strauss, Hauer & Feld, L.L.P.

(57) ABSTRACT

A tape cartridge including a single tape reel around which a length of magnetic tape is wound and which is turnably held within a housing, the beginning of the tape being fixed to a leader so that it can be drawn out through an opening formed in the housing by a tape drawing-out member of a recorder which has a pin-like or hooked end capable of engaging the tape end, said leader comprising a center part (pin-like member) on which the beginning of the tape is wound and a pair of engaging members joined to the upper and lower ends of the member so as to engage the tape drawing-out member of the recorder, said engaging members having a plurality of recesses each for engaging the drawing-out member. Thus the engaging members can consist of members identical in structure. In another embodiment the center member has position-confining portions formed close to its both ends to confine the positions of the engaging members.

12 Claims, 11 Drawing Sheets

TAPE CARTRIDGE

BACKGROUND OF THE INVENTION

1. Field of the Invention

This invention relates to a single-reel type tape cartridge for use with magnetic recording-reproducing apparatus and, more particularly, to improvements in the tape leader of a tape cartridge of the character.

2. Prior Art

Single-reel type tape cartridges are extensively used in computer backup and other data storage applications for safekeeping. With a tape cartridge of the type, a leader tape or leader member attached to the outer end of a magnetic tape is drawn out by a drawing-out member provided in a magnetic recording-reproducing apparatus (hereinafter referred to as a "recorder") or drive, the tape is led through passages in the recorder, and the tape end is fixed to the hub of another reel resident in the recorder. Upon conclusion of recording or playback operation the tape is driven backward and withdrawn into the cartridge, until the leader tape is reset in the original position in the cartridge.

Typical leader members for conventional single-reel type tape cartridges include one (disclosed, e.g., in Japanese Patent Application Kokai No. 58-169380) which comprises a pin, block, etc. secured to a tape end to be caught by a tape drawing-out member of a recorder. Another type uses a leader tape of relatively tough, elastic material which is connected to a magnetic tape end and has a hole at its own outer end adapted to be engaged with a corresponding hook of a drawing-out member of a recorder which too is formed of a relatively tough, elastic material (Japanese Patent Application Kokai No. 62-502641).

Figure 5:
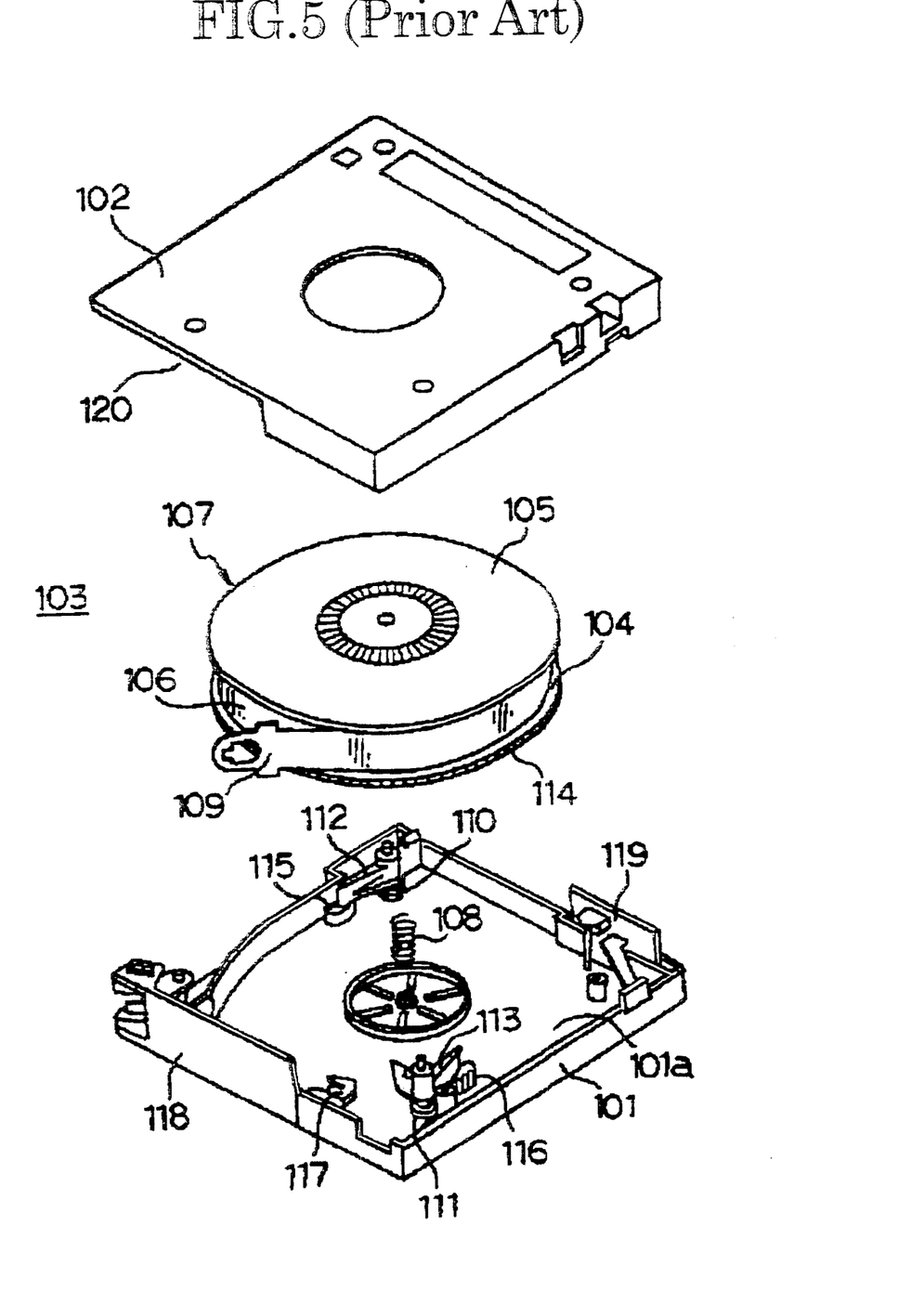
FIG. 5 is an exploded view of a tape cartridge of the prior art.

FIG. 5 is an exploded view of a single-reel type cartridge 103 using the technique disclosed in the above-mentioned Patent Application Kokai No. 62-502641. A housing of the cartridge composed of an upper half casing 101 and a lower half casing 102 is shown containing a single tape reel 107 which has an upper flange 104 and a lower flange 105, the tape reel 107 being normally biased toward the lower casing 102 by a compression spring 108. A leader tape 109 is spliced to the outer end of a length of magnetic tape 106 wound round a hub (not shown) of the upper flange 104 of the tape reel 107. The tape reel 107 has a bearing (not shown) on a ring which is press fitted in an annular recess (not shown) formed in the center of the upper flange 104. With a reel shaft (not shown) fitted in the bearing, the reel can revolve around the shaft. The upper flange 104 of the tape reel 107 has a serration 114 formed along its circumference. On the other hand, a pair of brake members 112, 113 are provided on the inner surface 101a of the upper casing 101 and are normally biased toward the serration 114 by torsion coil springs 110, 111, with cogs 115, 116, respectively, of the brake members 112, 112 in mesh with the serration 114 to keep the tape reel from revolution when the cartridge is not in use. When the cartridge is on standby the magnetic tape 106 is fully wound up on the tape reel 107, and an engaging hole formed at the end of the leader tape 109 is engaged with a hook 117 located close to a side wall of the cartridge housing 103. An opening 120 through which the magnetic tape 106 is drawn out from the cartridge housing 103 is normally closed by a lid 118 which is openable with respect to the cartridge housing.

As the cartridge is loaded into a recorder for use, the brake members 112, 113 are automatically set free and the tape reel 107 is lifted against the urging of the compression spring 108 to a position free to turn. At the same time, the lid 118 is opened by means provided for that purpose in the recorder.

The tape drawing-out member of the recorder then enters the housing through the opening to be engaged with the hole of the leader tape 109 and draws out the magnetic tape together with the leader tape in the manner described above, so that the tape is threaded in the route within the recorder.

Figure 6:
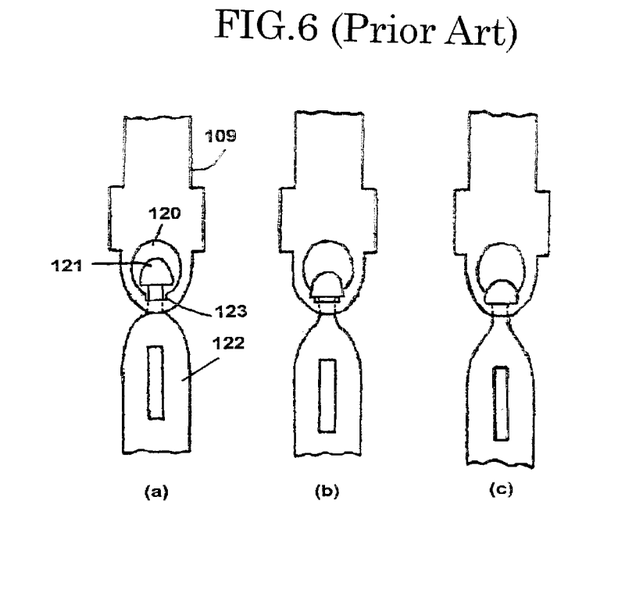
FIG. 6 illustrates how a conventional leader and tape drawing-out member are engaged.

The leader tape 109 is made using a thick spring sheet of tough synthetic resin such as polyethylene terephthalate (PET). As FIG. 6 indicates, a hole 120 is formed at the end of the tape so as to be engaged with a tab 121 (serving as a hook) formed at the end of a tape drawing-out member 122 of the recorder. The hole 120 has an angular cutout 123 to ensure positive engagement with the tab 121, with a neck of the drawing-out member that supports the tab 121 fitted in the cutout. FIG. 6 shows a sequence of the stages (a), (b), and (c) in which the drawing-out member 122 that gains entrance into the cartridge is progressively engaged with the leader tape 109.

The tape drawing-out mechanisms of the prior art present the following problems. The tape drawing-out member 122 of the recorder, as shown in FIG. 6, is in the form of a tape connected to a reel provided in the recorder, with the tape end having the tab 121 adapted to be engaged with the hole 120 of the leader tape in the tape cartridge. Since the drawing-out member 122 of the recorder and the end portions of the leader tape 109 are both tape-shaped, they are susceptible to curling. When the both curl, the tape drawing-out member 122 of the recorder becomes sometimes unable to engage the leader tape 109 of the cartridge loaded in the recorder.

On the other hand, direct coupling of the end of a magnetic tape to a tough leader member without. the aid of a leader tape would stabilize the actions of drawing out and drawing in of the magnetic tape. However, a somewhat complex structure of the leader member, unlike a PET one, involves difficulties in assembling during the course of cartridge manufacture. The present invention is aimed at providing a stabilized, solid leader of a structure which lends itself to more simplified manufacturing process than heretofore.

Figure 14:
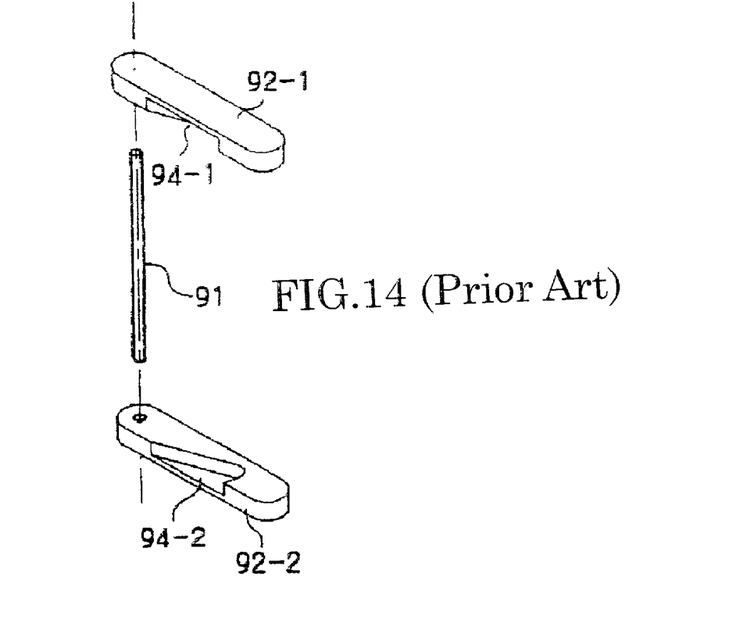
FIG. 14 is an exploded view of a leader of the prior art.

Such a leader member has an additional problem. As illustrated in FIG. 14, it comprises a center pin member 91 in the form of a pin on which a tape end is wound and secured in place by clamping, and a pair of engaging members 92-1, 92-2 fixed at one ends, respectively, to the upper and lower ends of the pin member. On the sides of the engaging members 92-1, 92-2 facing each other, there are formed engaging recesses 94-1, 94-2 in mirror symmetry adapted to engage a pin or hook of a drawing-out member of a recorder. The center pin member 91 is a solid, slender member made of metal and is fitted at both ends in blind holes formed at one ends of the engaging members 92-1, 92-2 both made of plastic.

The leader of the structure described has drawbacks. The center pin member 91 is not always fitted evenly and to the same depth in the blind holes of the engaging members 92-1, 92-2, with the result that the distance between the engaging members is inconstant and the variable dimensional relationship with the drawing-out member of a recorder leads to inadequate cartridge performance. When uneven forces are applied to the portions of the engaging members 92-1, 92-2 connected to the center pin member 91, the pin member can sometimes. turn within the blind holes and hamper positive action of the leader. The present invention is aimed at providing a tough leader of stable action with a structure enhanced in dimensional accuracy and which lends itself to more simplified manufacturing process than heretofore.

SUMMARY OF THE INVENTION

The present invention provides a tape cartridge including a single tape reel around which a length of magnetic tape is wound and which is turnably held within a housing, the beginning of the tape being fixed to a leader so that it can be drawn out through an opening formed in the housing by a tape drawing-out member of a recorder which has a pin-like or hooked end capable of engaging the tape end, said leader comprising a center part (pin-like member) on which the beginning of the tape is wound and a pair of engaging members joined to the upper and lower ends of the member so as to engage the tape drawing-out member of the recorder, said engaging members having a plurality of recesses each for engaging the drawing-out member. Thus the engaging members can consist of members identical in structure.

The engaging members are elongated tabs of the same structure either formed with engaging recesses in both end portions on one sides facing each other, the recesses having guide slopes extending therefrom toward the center where the two recesses meet, or formed with engaging recesses on both sides thereof in such configurations that the recesses on the sides facing each other are in mirror symmetry, said tabs having through holes formed close to the both ends thereof to receive the both ends of the center pin member to which a tape end is to be fixed.

In another aspect of the invention the cartridge includes a single tape reel around which a length of magnetic tape is wound and which is turnably held within a housing, the beginning of the tape being fixed to a leader so that it can be drawn out through an opening formed in the housing by a tape drawing-out member of a recorder which has an end capable of engaging the tape end. Here the leader comprises a center pin member on which the beginning of the tape is wound and a pair of engaging members joined to the upper and lower ends of the pin member so as to engage the tape drawing-out member of the recorder, said center pin member having position-confining portions formed close to its both ends to confine the positions of the engaging members.

The position-confining portions are shoulders or flanges that limit the depth of fitting of the center member into the engaging members or alternatively the portions have profile shapes in cross section so as to confine the positions in the turning direction of the engaging members.

Preferably, the position-confining portions are shoulders or flanges that limit the depth of fitting of the center member into the engaging members and have profile shapes in cross section so as to confine the positions in the turning direction of the engaging members.

In yet another aspect of the invention, the center pin member has arrays of several annulets formed at both ends, each in a thread-like formation, to be fitted in the engaging members.

The flanges or shoulders formed close to the both ends of the center pin member define the distance between the two engaging members when the both ends of the center pin member are fitted in the holes formed in the engaging members, since the outer sides or shoulders engage the opposing sides of the engaging members in the assembled state. The proper control of the spacing between the engaging members thus achieved enhances the dimensional accuracy of the leader and ensures optimum performance of the tape cartridge. The presence of flanges increases the support to the engaging members, allowing them to be less susceptible to deformation or distortion than otherwise.

In the embodiments where the both ends of the center pin have non-circular shapes in cross section, the engaging members are kept from turning around the pin and proper performance of the tape cartridge is ensured.

Where the center pin member has arrays of several annulets formed at both ends, each in a thread-like formation, the pin member attains a broader area of contact with the engaging members, and mutual bite enables the members to maintain a constant engaging relation.

DETAILED DESCRIPTION OF THE INVENTION

The present invention will be described in detail below in conjunction with a few preferred embodiments thereof.

Figure 1:
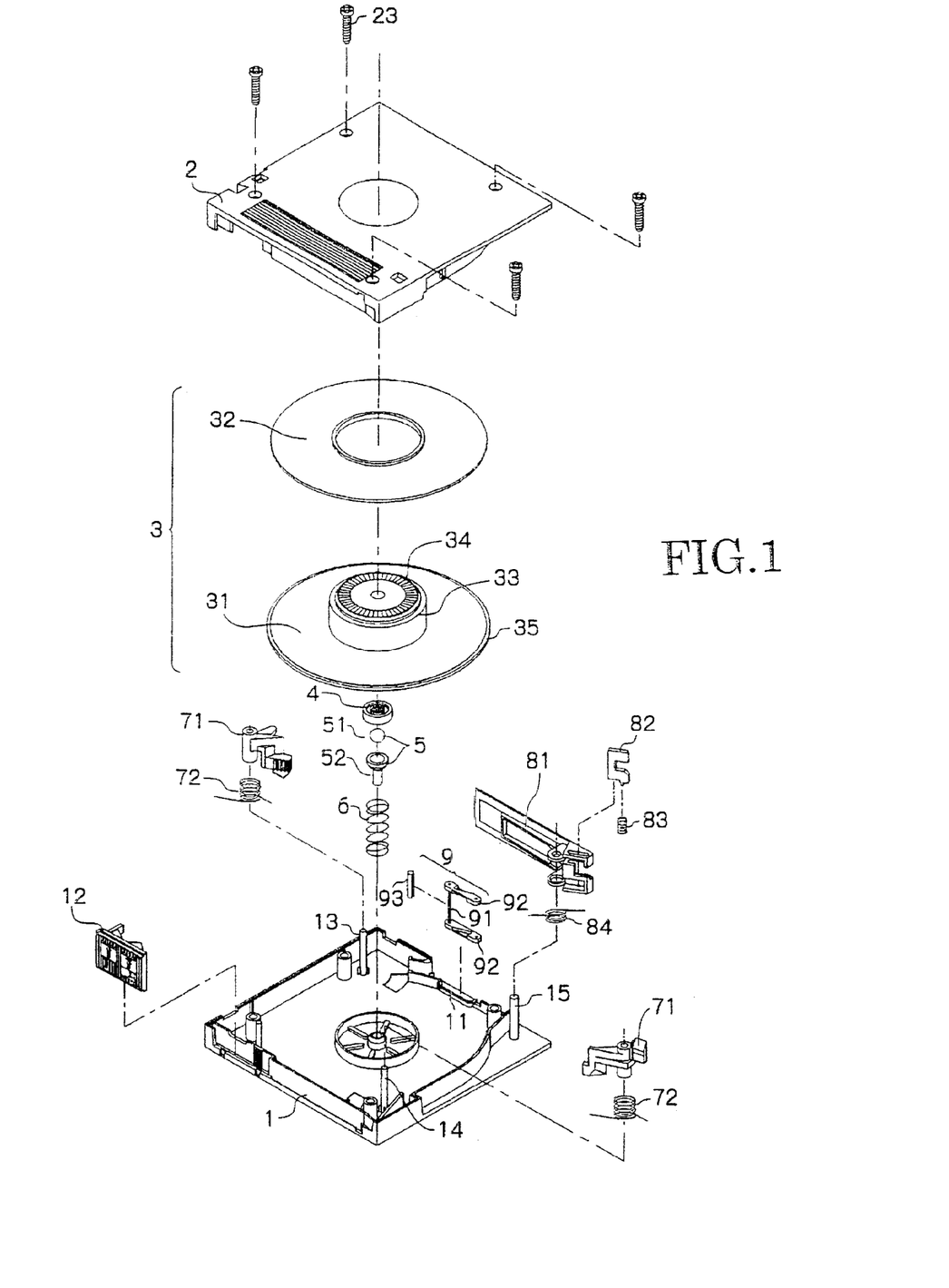
FIG. 1 is an exploded view of a tape cartridge embodying the present invention.
Figure 2A:
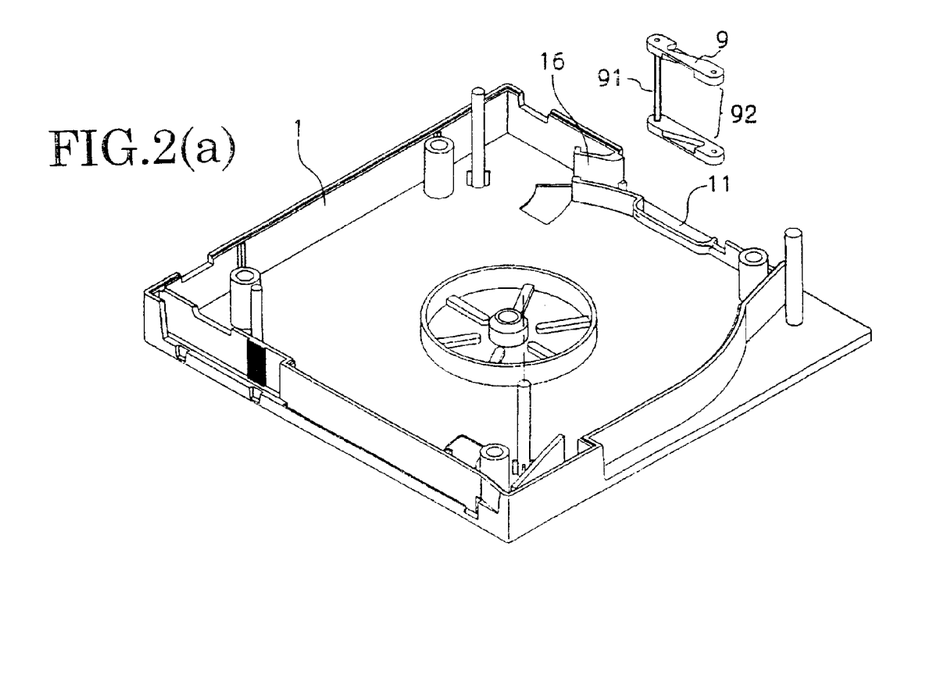
FIG. 2 illustrates the relationship between an upper casing and a leader embodying the invention, (a) showing the leader detached and (b) the tape cartridge while not in use.
Figure 2B:
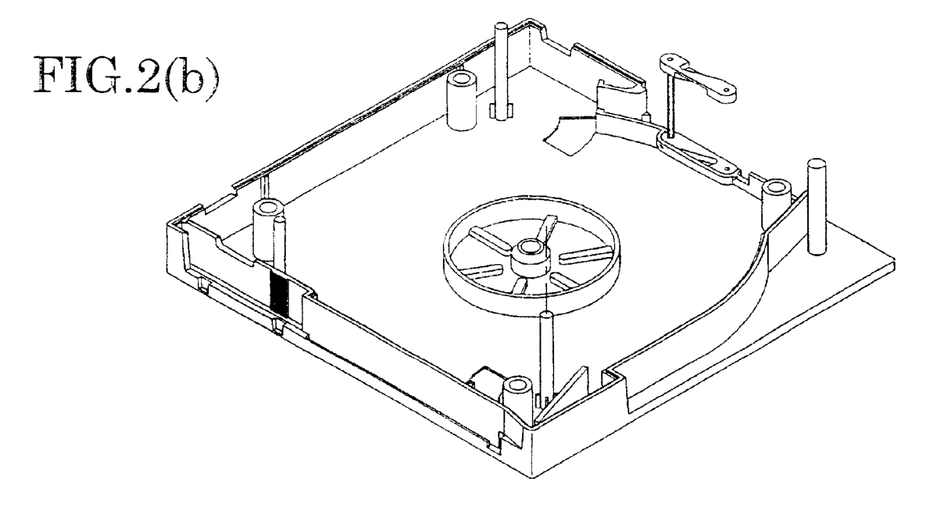
Figure 3:
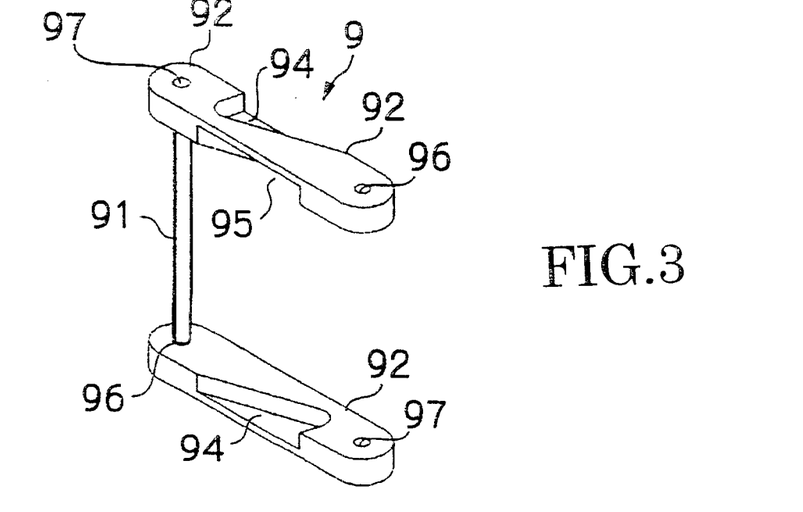
FIG. 3 is a perspective view of a leader embodying the invention.
Figure 4:
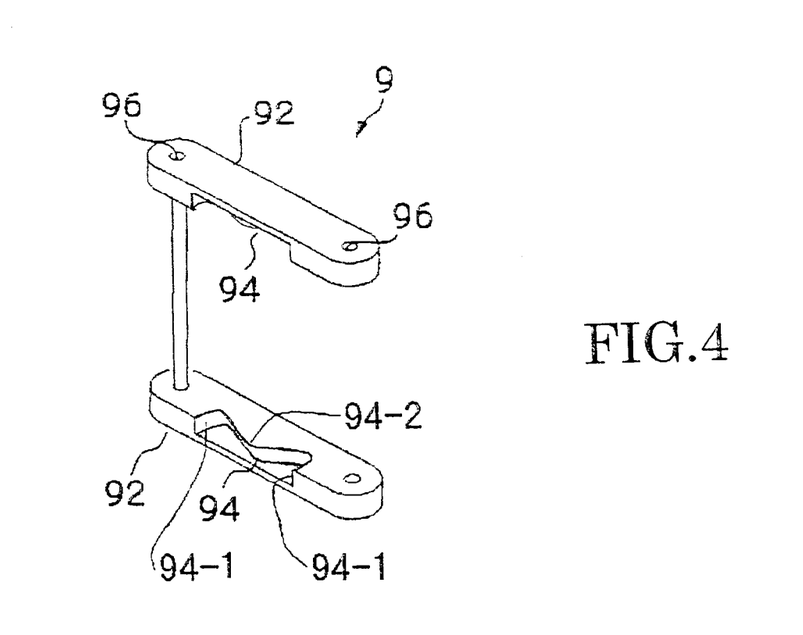
FIG. 4 is a perspective view of another leader embodying the invention.

FIG. 1 is an exploded view of an embodiment of the invention, FIG. 2 illustrates, in perspective, the relationship between an upper casing and a leader, and FIG. 3 is a detailed view, in perspective, of a leader. FIG. 4 is a detailed perspective view of another embodiment of the leader of the invention.

Referring to FIG. 1, a tape cartridge according to the invention is shown upside down. It illustrates how the parts look in actual assembling operation. A complete cartridge is loaded, in the regular unreversed posture, in a recorder. The cartridge is similar in construction to the cartridge shown in FIG. 5 excepting the leader and associated parts.

An upper casing 1 and a lower casing 2 are joined along edges using setscrews 23 to form a cartridge housing. A reel 3 on which a length of magnetic tape is wound is accommodated in the space inside the housing composed of the upper and lower casings.

The reel 3 consists of an upper flange 31, a hub 33 formed in one piece with the upper flange, and a lower flange 32. The underside of the hub 33 inward of the core on which the tape is wound is closed and is provided with an annular toothed part 34 adapted to mesh with drives of a recorder. The upper side of the hub 33 constitutes an open recess which contains a rotational reel support 5 composed of a bearing 4 that smoothens the rotation of the reel, a ball 51 in contact with the bearing 4, and a support member 52 recessed at top to receive the ball. The upper end of the support member 52 is received by a blind hole in the upper casing 1, and a coiled compression spring 6 loosely fitted around the support member constantly urges the bearing 4 and the rotational reel support 5 toward the reel.

An uneven surface 35 is formed along the circumference of the upper flange 31, and there are provided two brake mechanisms each composed of one of a pair of pins 13, 14 held upright on two diagonal corners inside the housing, a coiled torsion spring 72, and a brake member 71 with bore, the spring and brake member being fitted on the pin. When the cartridge is not in use, the two brake mechanisms coact to engage the brake members 71 with the uneven surface 35 on the circumference of the upper flange 31 so as to keep the reel from unwanted rotation.

The outer end of the tape is fixed to a leader 9. The leader 9 is made up of a center pin member 91, a pair of engaging members 92 fixed at one ends, respectively, to the upper and lower ends of the pin member, and a clamp 93 for clamping the tape end to the pin 91. The tape end is wound round the center pin member 91 and is secured in place with the clamp 93 fitted onto it. The leader 9 is housed in a pair of recesses 11 formed near the inner surface of an opening formed on one side of the housing.

On the outer side of the leader is fitted a turnable door member 81. The door member 81 is pivotally supported by a pin 15 of the upper casing 1 and is constantly biased to the closing direction by a torsion coil spring 84 fitted around the pin 15, and when the cartridge is not in use, it is locked by a door lock member 82 which, in turn, is under downward urging by a compression spring 83. A record defeat member 12 is held in a part of one side of the housing, slidably along that side.

Figure 8:
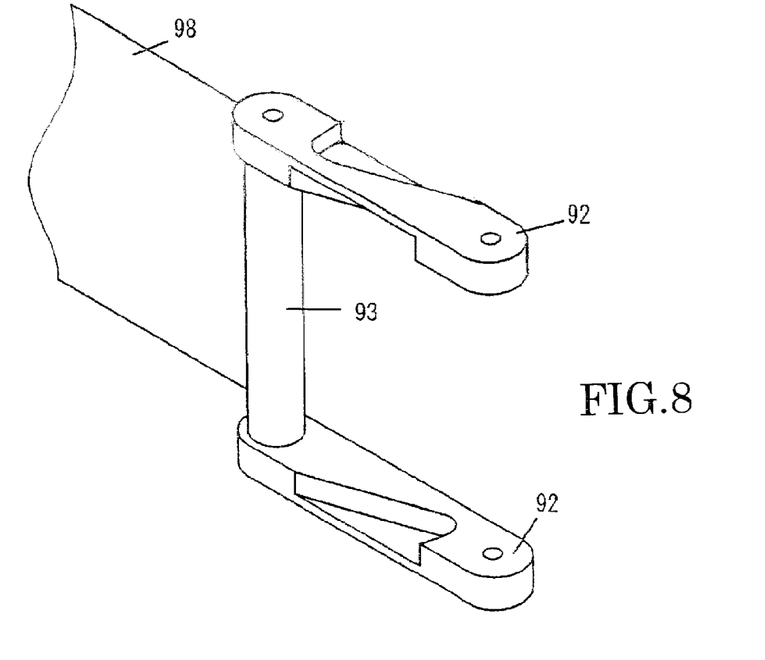
FIG. 8 is a perspective view of a leader as clamped in accordance with the invention.

FIG. 2 illustrates the relationship between the leader and one of the leader-containing recess 11, (a) showing the leader detached and (b) the leader accommodated in one recess. The upper and lower engaging members 92 of the leader 9 fit in the leader-containing recesses 11 formed in symmetrically opposite positions of the upper and lower casings. The outer end of the tape is drawn out through a tape guide slot 16 formed in the front wall of the housing and is secured to the center pin member 91 of the leader by the clamp 93 (FIG. 1). The clamp 93 is fitted to the center pin member 91 from the side between the engaging members 92 as shown in FIG. 8.

Figure 9:
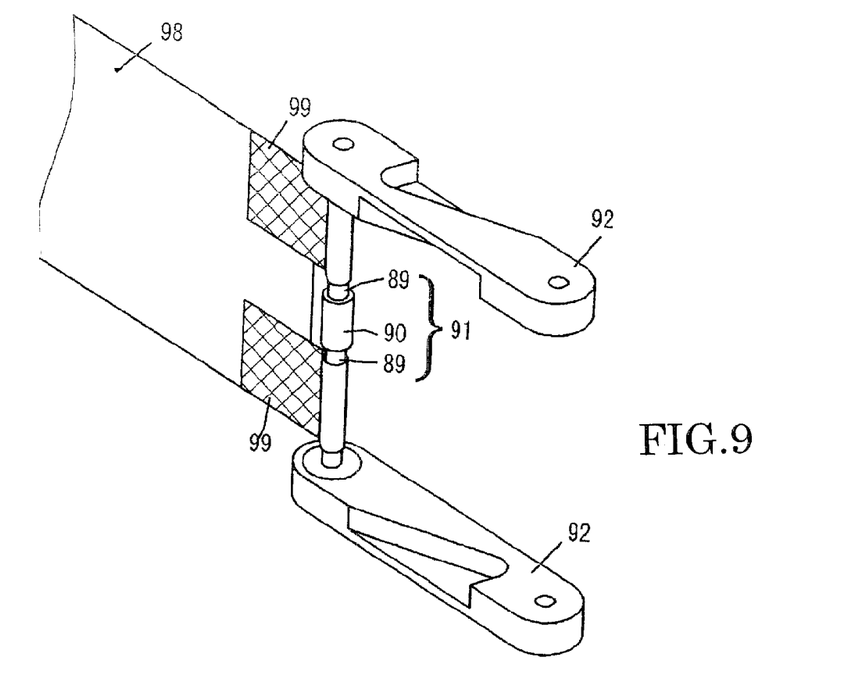
FIG. 9 is a perspective view of a leader of clamp-free type as connected to the end of a leader tape.
Figure 10:
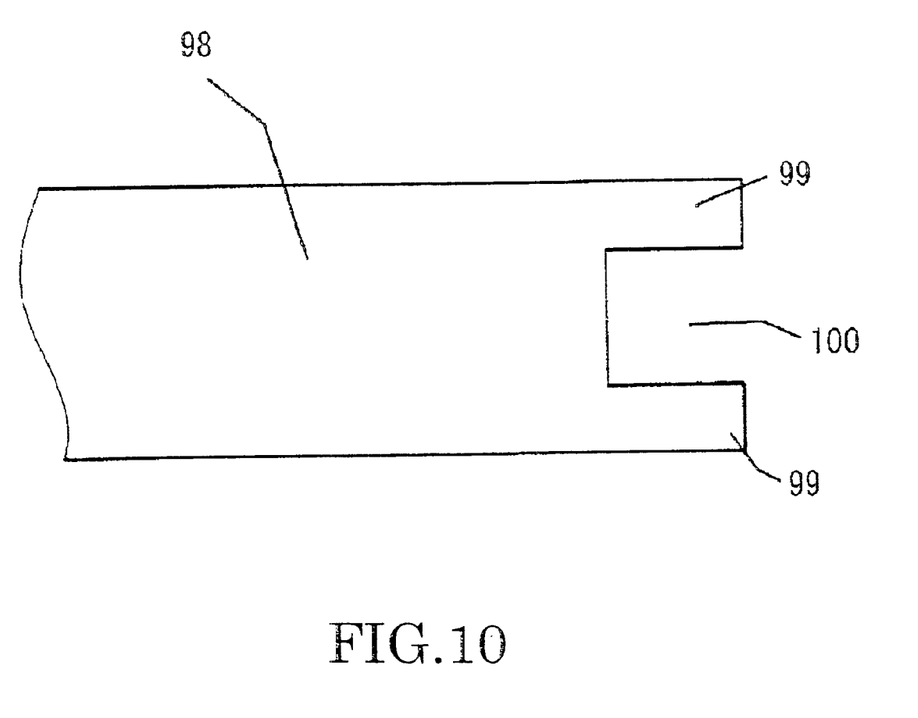
FIG. 10 is a plan view of the end of a clamp-free type leader tape.

As another embodiment of the invention an arrangement may be made so that a leader tape can be fixed to the center pin member without the aid of the clamp. FIG. 9 illustrates the embodiment in which a leader tape 98 has a center cutout 100 at the outer end, as shown in FIG. 10, thus bifurcating or leaving two extended end portions 99, which are to be wound round and fixed to the center pin member. On the other hand, as FIG. 9 shows, the center pin member 91 has two small-diameter portions 89 on which the end portions 99 of the leader tape are to be wound and a large-diameter portion 90 in between which prevents extreme deviation of the leader tape. The extended end portions 99 of the leader tape 98 are wound round the small-diameter portions 89 of the pin and their superposed layers are joined by ultrasonic welding or other technique to fix them to the pin member 91.

The embodiments of the invention to be described later may incorporate leaders of either clamp type or clamp-free type.

FIG. 3 illustrates the construction of the leader 9 in the first embodiment of the invention. The upper and lower engaging members 92 are elongated tabs of synthetic resin rounded at both ends with identical structure. They have through holes 96, 97 formed at both ends to receive the respective ends of the center pin member 91 of metal, and each engaging member has a generally right-triangle-shaped engaging recess 94 formed on one side, open to one edge, and an engaging recess 95 formed on the other side in a mirror symmetric pattern.

Figures 7A, 7B:
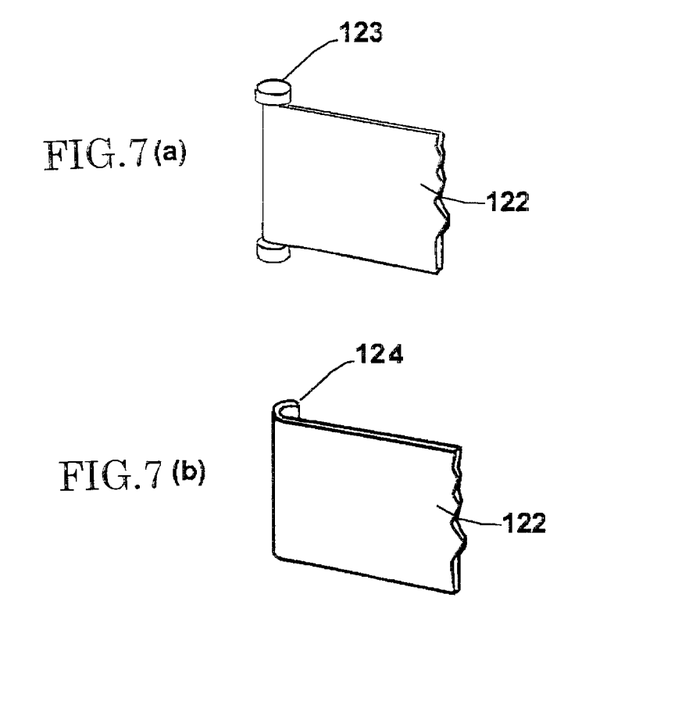
FIGS. 7(a)–(b) show, in perspective, fragments of tape drawing-out members for use with a cartridge of the invention.

FIG. 7 illustrates examples of drawing-out member 122. In FIG. 7 (a) is shown a member as a strip of PET or other synthetic resin spring material having a stop pin 123 at the free end. In FIG. 7 (b) a member as a strip of PET or other synthetic resin spring material is bent at the end as a permanently deformed hook 124. Accordingly, the engaging recesses 94, 95 are contoured in conformity with the configuration of the drawing-out member of the recorder, and the walls of the recesses are tapered to facilitate the engagement.

The members of the embodiment illustrated in FIG. 3 are assembled in the following way. Two engaging members are held apart in such a manner that the engaging recess 94 of one member faces the corresponding recess 95 of the other member, and the center. pin member is fitted securely in the holes 96, 97 of the two members.

FIG. 4 is a perspective view of yet another embodiment of the invention. Upper and lower engaging members 92 are elongated tabs of synthetic resin rounded at both ends with identical structure in mirror symmetry. They have through holes 96 formed at both ends to receive the respective ends of a center pin member 91 of metal, and each engaging member has an engaging recess 94 formed on one side, open to one edge. Each engaging recess has engaging walls 94-1 at both ends adapted to engage a drawing-out pin of a recorder, and the both engaging walls 94-1 have guide slopes reaching a center extension 94-2 in a rounded-M pattern.

To assemble the members of the embodiment shown in FIG. 4, the center pin member 91 is inserted fixedly at both ends into the holes 96 of the two engaging members 92, which are held apart with their engaging recesses 94 facing each other. In this embodiment too the upper and lower engaging members have identical structure, and therefore they can be made using the same mold and can be simply and easily assembled.

As has been described, the embodiments of the present invention use pairs of engaging members of the same structure, which can be made using one and the same plastic mold at accordingly reduced manufacturing cost. The leaders of the embodiments shown in FIGS. 3 and 4 may be turned upside down, in which case the open edges of the engaging recesses face the opposite direction (toward the farther or rightward edges). The invention is thus applicable to the leaders adapted to engage a drawing-out member of a recorder that approaches from the outer side.

Further embodiments of the invention will now be described in detail.

Figure 11:
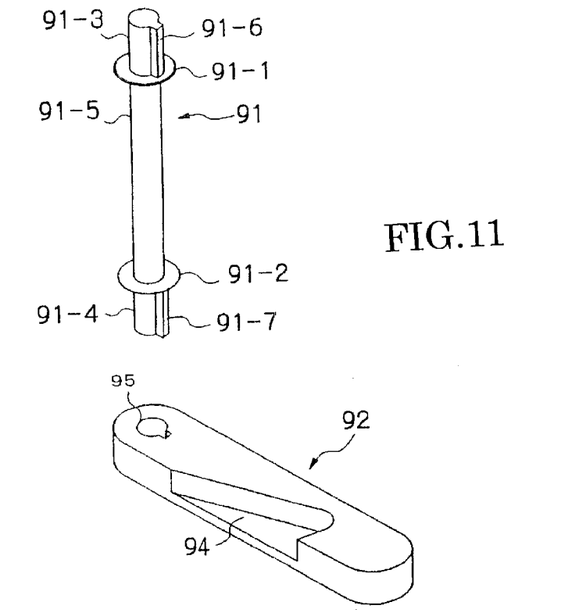
FIG. 11 is an exploded view, on an enlarged scale, of another leader embodying the invention.
Figure 15:
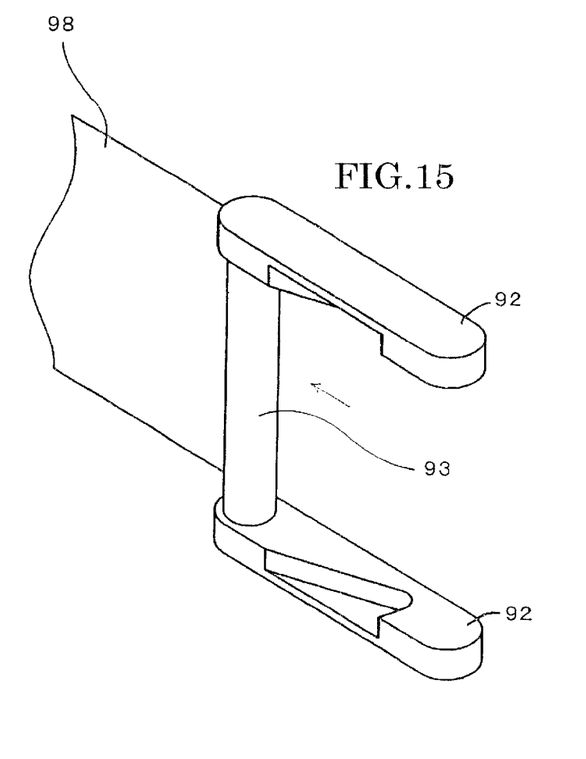
FIG. 15 is a perspective view of a leader and a leader tape clamped to the leader in accordance with the invention.

FIG. 11 shows the particulars of a leader 9 of another embodiment. A pair of engaging members 92 (only the lower one of the pair being shown, the upper member not shown being in parallel with the lower one) are elongated tabs of synthetic resin rounded at both ends to an identical configuration, and they are integrally fixed to the both ends of a center pin member 91 which consists of a solid pin on which one end of magnetic tape is to be wound and clamped in position. Flanges 91-1, 91-2 are formed close to the both ends of the center pin member 91 to confine the positions of the upper and lower edges of magnetic tape that is clamped in place and also to keep the spacing between, and reinforce, the engaging members 92. The opposing sides of the upper and lower engaging members 92 are formed with generally right-triangle-shaped engaging recesses 94, open to one edge, in mirror symmetry. The engaging recesses 94 are adapted to engage the pin or hook at the front end of a drawing-out member of a recorder, as indicated in FIG. 7. A clamp 93 is fitted onto the center pin member 91, as shown in FIG. 15, from between the engaging members 92.

As FIG. 11 shows, the center pin member 91 has a columnar tape-carrying portion 91-5 in the center, the pair of flanges 91-1, 91-2 formed close to the both ends for positional confinement of the engaging members 92, and stud portions 91-3, 91-4 adapted to fit in holes 95 formed in the engaging members 92. The distance between the opposing faces of the flanges 91-1, 91-2 is defined to be substantially equal to the width of the magnetic tape. The stud portions 91-3, 91-4 have, respectively, longitudinal ribs 91-6, 91-7 formed on the outer surface. and corresponding fantail-shaped holes 95 are formed in the engaging members.

The stud portion 91-3 of the center pin member 91 is inserted into the hole 95 of one of the engaging members 92, and the flange 91-2 is fixed with adhesive or by other means to the engaging member 92 at the point where it comes in contact with the latter. The same applies to the fixing of the pin member to the upper engaging member. As an alternative, the center pin member 91 may be joined to the engaging members 92 by molding plastic into the pin member and the engaging members in one piece.

Figure 12:
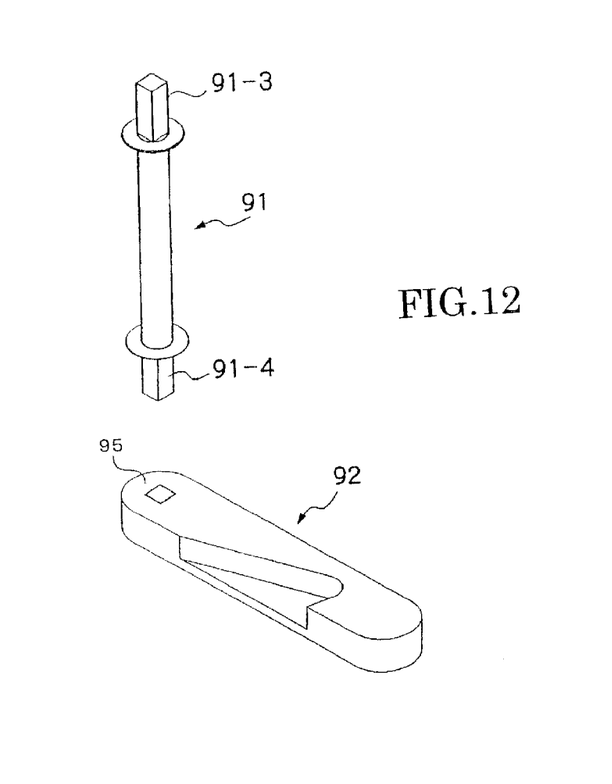
FIG. 12 is an exploded view, on an enlarged scale, of yet another leader embodying the invention.

FIG. 12 is a perspective view similar to FIG. 11 but showing still another embodiment of the invention. Here the stud portions 91-3, 91-4 are square in cross section, and accordingly the holes 95 of the engaging members too are square-shaped.

Figure 13A:
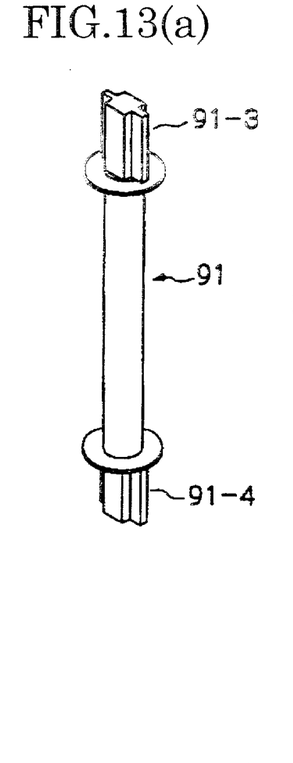
FIGS. 13(a)–(c) show, in perspective, a few other center pin members of modified structures for use in other leaders according to the invention.
Figure 13B:
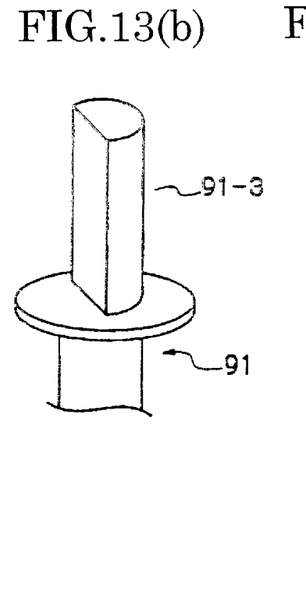
Figure 13C:
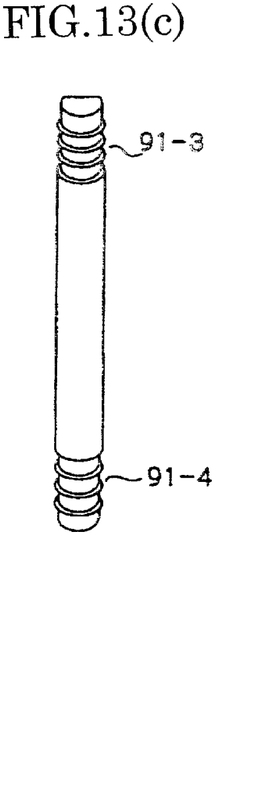

Moreover, the stud portions 91-3, 91-4 may take various other shapes as illustrated in FIG. 13. The center pin member 91 shown at (a) in FIG. 13 has a stud portion cruciform in cross section; the pin member at (b) has a stud portion 91-3 semicircular in cross section; and the pin member at (c) has stud portions 91-3, 91-4 at both ends, each comprising an array of several annulets in a thread-like formation to ensure non-removable joining, the inner end of the stud portion serving as a shoulder. The annulets are tapered in the direction where the stud portion is kept from coming off the hole of the corresponding engaging member.

Figure 16:
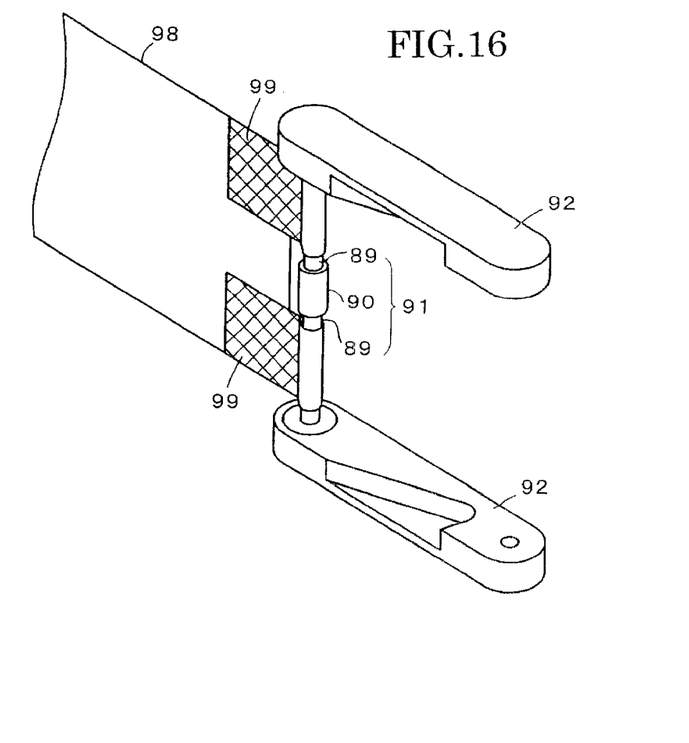
FIG. 16 is a perspective view of a leader tape fixed to a leader of clamp-free type.
Figure 17:
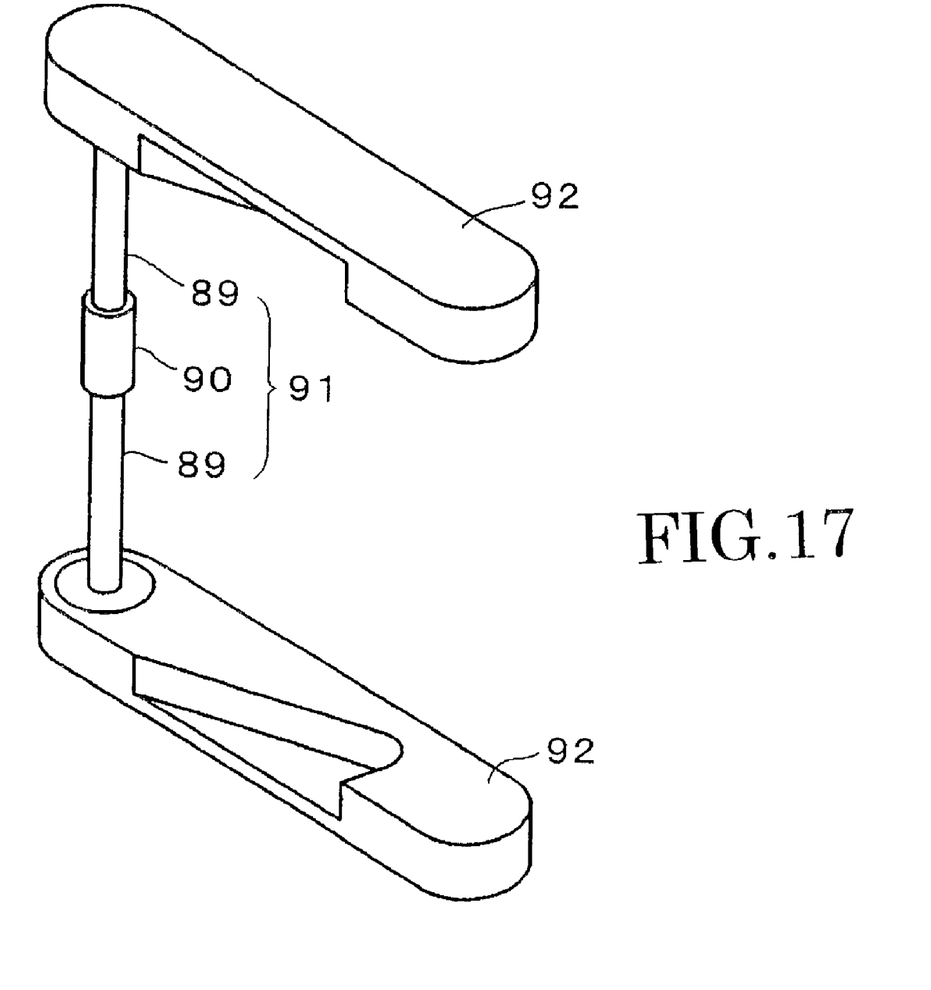
FIG. 17 is a perspective view of the leader shown in FIG. 16.

In a further modified form of the invention, a leader tape may be fixed to the center pin member without using the clamp. FIG. 16 illustrates the embodiment in which a leader tape 98 has a center cutout 100 at the outer end as shown, thus bifurcating or leaving two extended end portions 99, which are to be wound round and fixed to the center pin member. On the other hand, as FIG. 17 shows, the center pin member 91 has two small-diameter portions 89 on which the end portions 99 of the leader tape are to be wound and a large-diameter portion 90 in between which prevents extreme deviation of the leader tape. As FIG. 16 shows, the extended end portions 99 of the leader tape 98 are wound round the small-diameter portions 89 of the pin member and their superposed layers are joined by ultrasonic welding or other technique to fix them to the pin member 91.

In the above-described embodiments of the invention, the outer sides or shoulders or the flanges that serve as position-confining portions define the distance between two engaging members when the both ends of the center pin member are fitted in the holes formed in the engaging members, since the outer sides or shoulders engage the opposing sides of the engaging members in the assembled state. The proper control of the spacing between the engaging members enhances the dimensional accuracy of the leader and ensures optimum performance of the tape cartridge. Furthermore, because the position-confining portions have profile shapes other than circular in cross section and the holes of the engaging members also have shapes corresponding to the cross sections of the center pin member, the engaging members are protected against mutual deformation or disengagement in directions of turning with external forces, and proper performance of the leader is ensured.

What is claimed is:

1. A tape cartridge including a single tape reel around which a length of magnetic tape is wound and which is turnably held within a housing, the beginning of the tape being fixed to a leader so that it can be drawn out through an opening formed in the housing by a tape drawing-out member of a recorder which has a pin-like or hooked end capable of engaging the tape end, said leader comprising a center pin member on which the beginning of the tape is wound and a pair of engaging members joined to the upper and lower ends of said center pin member so as to engage the tape drawing-out member of the recorder, said engaging members being identical in structure, having a plurality of recesses each for engaging said drawing-out member in such a manner that the recesses of said engaging members as joined to the center pin member being parallel in mirror symmetry.

2. The tape cartridge of claim 1, wherein the pair of engaging members are elongated tabs of the same structure formed with engaging recesses in both end portions on one side thereof facing each other, said engaging recesses being adapted to engage a drawing-out pin of the drawing-out member of the recorder, said recesses having guide slopes extending therefrom toward the center where the two recesses meet.

3. The tape cartridge of claim 1, wherein the pair of engaging members are elongated tabs of the same structure formed with engaging recesses on both sides thereof in such configurations that the recesses on the sides facing each other are in mirror symmetry, said tabs having through holes formed close to the both ends thereof to receive the both ends of the center pin member to which a tape end is to be fixed.

4. The tape cartridge of claim 1 wherein the leader further comprises a clamp which fixes the end of tape onto the center member.

5. The tape cartridge of claim 1, wherein the center pin member consists of a solid pin member having a large-diameter portion midway and small-diameter portions adjacent to both ends of the large-diameter portion for holding bifurcated end portions of a leader tape.

6. A tape cartridge including a single tape reel around which a length of magnetic tape is wound and which is turnably held within a housing, the beginning of the tape being fixed to a leader so that it can be drawn out through an opening formed in the housing by a tape drawing-out member of a recorder which has an end capable of engaging the tape end, said leader comprising a center pin member on which the beginning of the tape is wound and a pair of engaging members joined to the upper and lower ends of said pin member so as to engage the tape drawing-out member of the recorder, said center pin member having position-confining portions formed close to the both ends thereof to confine the positions of the engaging members.

7. The tape cartridge of claim 6, wherein the position-confining portions are shoulders or flanges that limit the depth of fitting of the center pin member into the engaging members.

8. The tape cartridge of claim 6, wherein the position-confining portions are position-confining portions have profile shapes in cross section so as to confine the positions in the turning direction of the engaging members.

9. The tape cartridge of claim 6, wherein the position-confining portions are shoulders or flanges that limit the depth of fitting of the center member into the engaging members and have profile shapes in cross section so as to confine the positions in the turning direction of the engaging members.

10. The tape cartridge of claim 6, wherein the center pin member has arrays of several annulets formed at both ends, each in a thread-like formation, to be fitted in the engaging members.

11. The tape cartridge of claim 6, wherein the leader further comprises a clamp to fix the tape onto the center pin member.

12. The tape cartridge of claim 6, wherein the center pin member consists of a solid pin member having a large-diameter portion midway and small-diameter portions adjacent to both ends of the large-diameter portion for holding bifurcated end portions of a leader tape.

* * * * *